(12) United States Patent
Lin

(10) Patent No.: US 7,813,057 B2
(45) Date of Patent: Oct. 12, 2010

(54) OPTICAL LENS SYSTEM FOR TAKING IMAGE

(75) Inventor: Ming Ching Lin, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/324,834

(22) Filed: Nov. 27, 2008

(65) Prior Publication Data
US 2010/0020417 A1 Jan. 28, 2010

(30) Foreign Application Priority Data
Jul. 25, 2008 (TW) .............................. 97128332 A

(51) Int. Cl.
*G02B 9/36* (2006.01)
(52) U.S. Cl. .................. 359/775; 359/773; 359/774
(58) Field of Classification Search ......... 359/771–780, 359/667, 668
See application file for complete search history.

(56) References Cited

U.S. PATENT DOCUMENTS

| | | | | |
|---|---|---|---|---|
| 2,500,046 A | * | 3/1950 | Schade | 359/786 |
| 6,259,508 B1 | * | 7/2001 | Shigematsu | 355/53 |
| 7,515,358 B2 | * | 4/2009 | Noda | 359/785 |

\* cited by examiner

*Primary Examiner*—Timothy J Thompson
(74) *Attorney, Agent, or Firm*—Banger Shia

(57) ABSTRACT

An optical lens system for taking image comprises: a first lens element with positive refractive power, an Abbe Number of the first lens element being V1, and it satisfying the relation: 50<V1<60; a second lens element with negative refractive power having a concave object-side surface and a convex image-side surface; a third lens element having a convex object-side surface and a concave image-side surface, at least one of the object-side and the image-side surfaces of the third lens element being aspheric; a fourth lens element having at least one aspheric surface; and an aperture stop being located in front of the second lens element.

20 Claims, 6 Drawing Sheets

OPTICAL LENS SYSTEM FOR TAKING IMAGE

BACKGROUND OF THE INVENTION

1. Field of the Invention

The present invention relates to an optical lens system for taking image, and more particularly to an optical lens system for taking image used in a miniaturized digital camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera usually consists of three lens elements: from the object side to the image side: a first lens element with positive refractive power, a second lens element with negative refractive power and a third lens element with positive refractive power, such as the optical lens system for taking image described in U.S. Pat. No. 7,145,736.

As the pixel size of electronic imaging sensors gradually becomes smaller and smaller, the system requires higher image quality. The conventional optical lens system comprising three lens elements cannot satisfy the requirements of higher resolution optical lens systems.

U.S. Pat. No. 7,365,920 discloses a four-piece lens assembly, in which the first lens element and the second lens element, which are both spherical lens elements, are bonded to each other to form a doublet lens for eliminating chromatic aberration. However, it suffers from the following disadvantages: the freedom of the optical system is insufficient since there are too many spherical lens elements; and the manufacturing difficulty is increased due to the difficult process of bonding glass lens elements.

The present invention mitigates and/or obviates the aforementioned disadvantages.

SUMMARY OF THE INVENTION

The primary objective of the present invention is to provide a new optical lens system comprising four lens elements for taking image to improve image quality, and effectively reduce the volume of the optical lens system.

According to one aspect of the present invention, an optical lens system for taking image in accordance with the present invention comprises: from the object side to the image side: a first lens element with positive refractive power; a second lens element with negative refractive power having a concave object-side surface and a convex image-side surface and being located behind the first lens element; a third lens element having a convex object-side surface and a concave image-side surface and being located behind the second lens element, at least one of the object-side and the image-side surfaces of the third lens element being aspheric; a fourth lens element having at least one aspheric surface and being located behind the third lens element; and an aperture stop being located before the second lens element.

In the present optical lens system for taking image, typically the refractive power of the system is mainly provided by the first lens element with positive refractive power. The second lens element with negative refractive power mainly serves to correct the chromatic aberration. The third lens element and the fourth lens element serve as correction lenses to balance and correct various aberrations caused by the optical lens system.

The first lens element provides a strong positive refractive power, and the aperture stop is located close to the object side, so that the total track length of the optical lens system can be effectively reduced, and the exit pupil of the optical lens system will be far away from the image plane. Therefore, the light will be projected onto the sensor with a relatively small incident angle, this is the telecentric feature of the image side, and this feature is very important to the photosensitive power of current solid-state sensors, since they are more sensitive when the light is incident at a small angle. This also reduces the probability of the occurrence of shading. The inflection points formed on the third lens element and the fourth lens element will contribute to a better correction of the incident angle of the off axis light with respect to the sensor and makes the peripheral image plane more flat.

In addition, in the wide angle optical system, it is especially necessary to correct the distortion and the chromatic aberration of magnification, and this can be solved by locating the aperture stop at the balance point of the refractive power of the system.

In the present optical lens system for taking image, if the aperture stop is located in front of the first lens element, the telecentric feature of the optical lens system becomes obvious, the total track length of the optical lens system will become quite shorter. If the aperture stop is located between the first and second lens elements, the feature of wide field of view will become obvious, and the optical system is less sensitive as well.

According to another aspect of the present invention, in the present optical lens system for taking image, the first lens element has a convex object-side surface and a convex or concave image-side surface. If the image-side surface of the first lens element is convex, the emphasis is focused on correcting the spherical aberration caused by the system. If the image-side surface of the first lens element is concave, the emphasis is focused on correcting the astigmatism. The second lens element has the concave object-side surface and the convex image-side surface. The third lens element has the convex object-side surface and the concave image-side surface. The fourth lens element has a convex object-side surface and a concave image-side surface. Such an arrangement can effectively improve the image quality.

With the trend of miniaturization of the optical lens system and the requirement of a large field of view, the focal length of the optical lens system is becoming very short. Therefore, the radius of curvature and the size of the lens elements must be very small, and it is impossible to make such glass lens elements by the use of conventional grinding. Plastic material is introduced to make lens elements by injection molding, using a relatively low cost to produce high precision lens elements. The lens elements are provided with aspheric surfaces, allowing more design parameters (than spherical surfaces), so as to better correct aberrations and reduce the number of the lens elements.

According to another aspect of the present invention, in the present optical lens system for taking image, the refractive index of the first lens element is N1, the refractive index of the third lens element is N3, and they satisfy the relations:

$1.52 < N1 < 1.58;$ $1.52 < N3 < 1.58.$

If the refractive index of the first lens element N1 and the refractive index of the third lens element N3 satisfy the above relation, the plastic optical material with the refractive index within the above range will better match the optical lens system.

According to another aspect of the present invention, in the present optical lens system for taking image, the focal length of the optical lens system for taking image is f, the focal length of the first lens element is f1, the focal length of the second lens element is f2, and they satisfy the relations:

$0.8 < f/f1 < 1.2;$ $-0.75 < f/f2 < -0.3.$

If the value of f/f1 is smaller than the above lower limit, the refractive power of the first lens element will be weak, the total track length of the system will be too long, and it will be difficult to suppress the incident angle of the light with respect to the sensor; if the value of f/f1 is greater than the above upper limit, the high order aberrations of the system will be too large. If the value of f/f2 is smaller than the above lower limit, the total track length of the system will be too long; if the value of f/f2 is greater than the above upper limit, it will be difficult to correct the chromatic aberration. Further, it will be better if f/f1 and f/f2 satisfy the relations:

$0.95 < f/f1 < 1.15;$ $-0.5 < f/f2 < -0.3.$

According to another aspect of the present invention, in the present optical lens system for taking image, the focal length of the optical lens system for taking image is f, the focal length of the third lens element is f3, the focal length of the fourth lens element is f4, and they satisfy the relations:

$-0.2 < f/f3 < 0.2;$ $-0.2 < f/f4 < 0.2;$

The third lens element and the fourth lens element serve as correction lens elements to balance and correct various aberrations caused by the optical lens system.

According to another aspect of the present invention, in the present optical lens system for taking image, the on-axis distance between the third lens element and the fourth lens element is T34, the focal length of the optical lens system for taking image is f, and they satisfy the relation:

$T34/f > 0.015.$

If T34/f satisfies the above relation, it will be favorable to correct the high order aberrations of the system.

According to another aspect of the present invention, in the present optical lens system for taking image, the Abbe number of the first lens element is V1, the Abbe number of the second lens element is V2, the Abbe number of the third lens element is V3, and they satisfy the relations:

$50 < V1 < 60;$ $V1 - V2 > 15;$ $V3 - V2 > 15.$

If V1, V2, V3 satisfy the above relations, the chromatic aberration of the optical lens system can be more favorably corrected, improving the resolution of the optical lens system. Further, it will be better if V2 satisfies the relation:

$V2 < 26.8.$

According to another aspect of the present invention, in the present optical lens system for taking image, the radius of curvature of the object-side surface of the first lens element is R1, the radius of curvature of the image-side surface of the first lens element is R2, and they satisfy the relation:

$0.2 < R1/R2 < 05;$

If the value of R1/R2 is smaller than the above lower limit, it will be difficult to correct the astigmatism caused by the system. And if the value of R1/R2 is greater than the above upper limit, it will be difficult to correct the spherical aberration caused by the system. Further, it will be better if R1, R2 satisfy the relation:

$0.3 < R1/R2 < 0.5.$

According to another aspect of the present invention, in the present optical lens system for taking image, the optical lens system for taking image may further comprise an electronic imaging sensor for enabling an object to be photographed to be imaged on it, a total track length of the optical lens system for taking image is TTL, a maximum image height of the optical lens system for taking image is ImgH, and they satisfy the relation:

$TTL/ImgH < 1.9.$

The above relation can maintain the objective of miniaturization of the optical lens system for taking image.

The present invention will become more obvious from the following description when taken in connection with the accompanying drawings, which show, for purpose of illustration only, the preferred embodiments in accordance with the present invention.

DETAILED DESCRIPTION OF THE PREFERRED EMBODIMENTS

Figure 1:
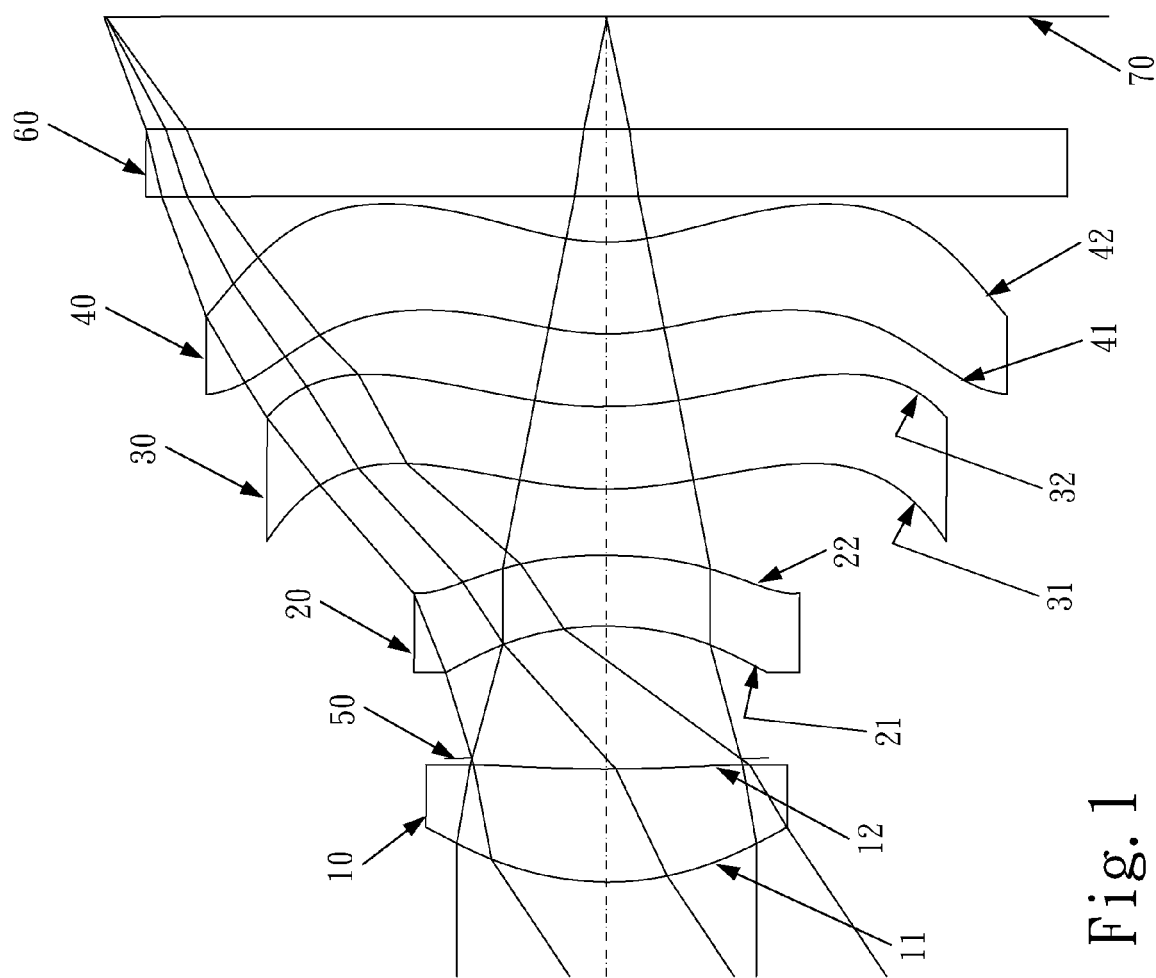
FIG. 1 shows an optical lens system for taking image in accordance with a first embodiment of the present invention.
Figure 2:
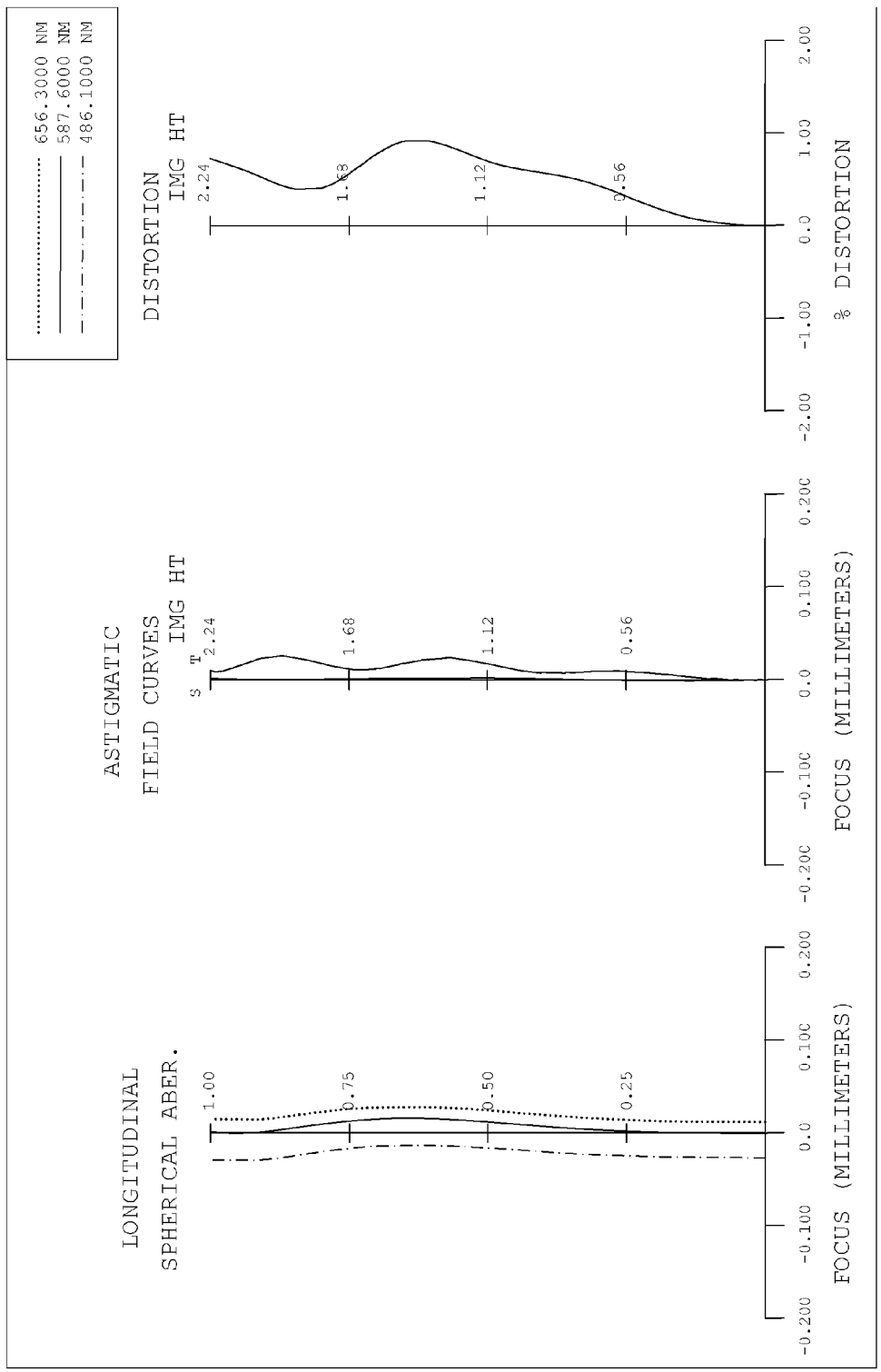
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. An optical lens system for taking image in accordance with the first embodiment of the present invention comprises: from the object side to the image side:

A plastic first lens element 10 with positive refractive power has a convex object-side surface 11 and a concave image-side surface 12, and the object-side surface 11 and the image-side surface 12 of the first lens element 10 are both aspheric.

A plastic second lens element 20 with negative refractive power has a concave object-side surface 21 and a convex image-side surface 22, the object-side surface 21 and the image-side surface 22 of the second lens element 20 are both aspheric.

A plastic third lens element 30 with positive refractive power has a convex object-side surface 31 and a concave image-side surface 32, the object-side surface 31 and the image-side surface 32 of the third lens element 30 are both aspheric, and inflection points are formed on both the object-side surface 31 and the image-side surface 32 of the third lens element 30.

A plastic fourth lens element 40 with negative refractive power has a convex object-side surface 41 and a concave image-side surface 42, the object-side surface 41 and the image-side surface 42 of the fourth lens element 40 are both aspheric, and inflection points are formed on both the object-side surface 41 and the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the first embodiment is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis, relative to the tangential plane of the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the second lens element is f2, the focal length of the third lens element is f3, the focal length of the fourth lens element is f4, and they satisfy the relations:

f=3.30 [mm];

$f/f1$=1.08;

$f/f2$=−0.36;

$f/f3$=0.06;

$f/f4$=−0.02.

In the first embodiment of the present optical lens system for taking image, the refractive index of the first lens element is N1, and it satisfies the relation:

N1=1.544.

In the first embodiment of the present optical lens system for taking image, the refractive index of the third lens element is N3, and it satisfies the relation:

N3=1.530.

In the first embodiment of the present optical lens system for taking image, the Abbe number of the first lens element is V1, the Abbe number of the second lens element is V2, the Abbe number of the third lens element is V3, and they satisfy the relations:

V1=56.1;

V2=23.4;

$V1-V2$=32.7;

$V3-V2$=32.4.

In the first embodiment of the present optical lens system for taking image, the on-axis distance between the third lens element and the fourth lens element is T34, the focal length of the optical lens system for taking image is f, and they satisfy the relation:

$T34/f$=0.10.

In the first embodiment of the present optical lens system for taking image, the radius of curvature of the object-side surface of the first lens element is R1, the radius of curvature of the image-side surface of the first lens element is R2, and they satisfy the relation:

$R1/R2$=0.21.

In the first embodiment of the present optical lens system for taking image, the total track length of the optical lens system for taking image is TTL, the maximum image height of the optical lens system for taking image is ImgH, and they satisfy the relation:

$TTL/ImgH$=1.72.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 3.30 mm, Fno = 2.45, HFOV (half of field of view = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.34730(ASP) | 0.502 | Plastic | 1.544 | 56.1 | 3.02 |
| 2 | | 6.34670(ASP) | 0.047 | | | | |
| 3 | Ape. Stop | Plano | 0.590 | | | | |
| 4 | Lens 2 | −1.47293(ASP) | 0.316 | Plastic | 1.632 | 23.4 | −9.1 |
| 5 | | −2.13658(ASP) | 0.295 | | | | |
| 6 | Lens 3 | 1.68423(ASP) | 0.366 | Plastic | 1.530 | 55.8 | 51.41 |
| 7 | | 1.65909(ASP) | 0.324 | | | | |
| 8 | Lens 4 | 1.14839(ASP) | 0.410 | Plastic | 1.530 | 55.8 | −137.87 |
| 9 | | 0.99042(ASP) | 0.200 | | | | |
| 10 | IR-filter | Plano | 0.300 | Glass | 1.517 | 64.1 | |

TABLE 1-continued (Embodiment 1)
f(focal length) = 3.30 mm, Fno = 2.45, HFOV (half of field of view = 34.0 deg.

| Surface # | | Curvature Radius | Thickness | Material | Index | Abbe # | Focal length |
|---|---|---|---|---|---|---|---|
| 11 | | Plano | 0.490 | | | | |
| 12 | Image | Plano | | | | | |

TABLE 2

Aspheric Coefficients

| | Surface # | | | | | | | |
|---|---|---|---|---|---|---|---|---|
| | 1 | 2 | 4 | 5 | 6 | 7 | 8 | 9 |
| k = | −3.65900E+00 | −6.59319E+01 | 2.43333E+00 | 4.19240E+00 | −5.09682E+00 | −1.31678E+01 | −2.21724E+00 | −3.88017E+00 |
| A4 = | 1.74776E−01 | −1.47749E−02 | −1.47806E−01 | −2.36922E−01 | −1.62471E−01 | −5.15453E−03 | −5.95111E−01 | −3.14734E−01 |
| A6 = | −1.50051E−01 | −6.79355E−02 | 5.32921E−01 | 4.96371E−01 | 7.58587E−02 | −4.87077E−02 | 5.76464E−01 | 2.39193E−01 |
| A8 = | 2.03865E−01 | −8.71980E−02 | −5.34106E−01 | −2.66505E−01 | −4.22122E−02 | 2.35423E−02 | −3.56771E−01 | −1.20334E−01 |
| A10 = | −2.50631E−01 | | 1.18175E+00 | 3.89742E−01 | 6.95530E−03 | −9.75276E−03 | 1.20371E−01 | 3.05639E−02 |
| A12 = | | | | | | 2.24217E−03 | −1.98144E−02 | −3.74267E−03 |
| A14 = | | | | | | −3.07996E−04 | 1.25127E−03 | 1.96390E−04 |

Figure 3:
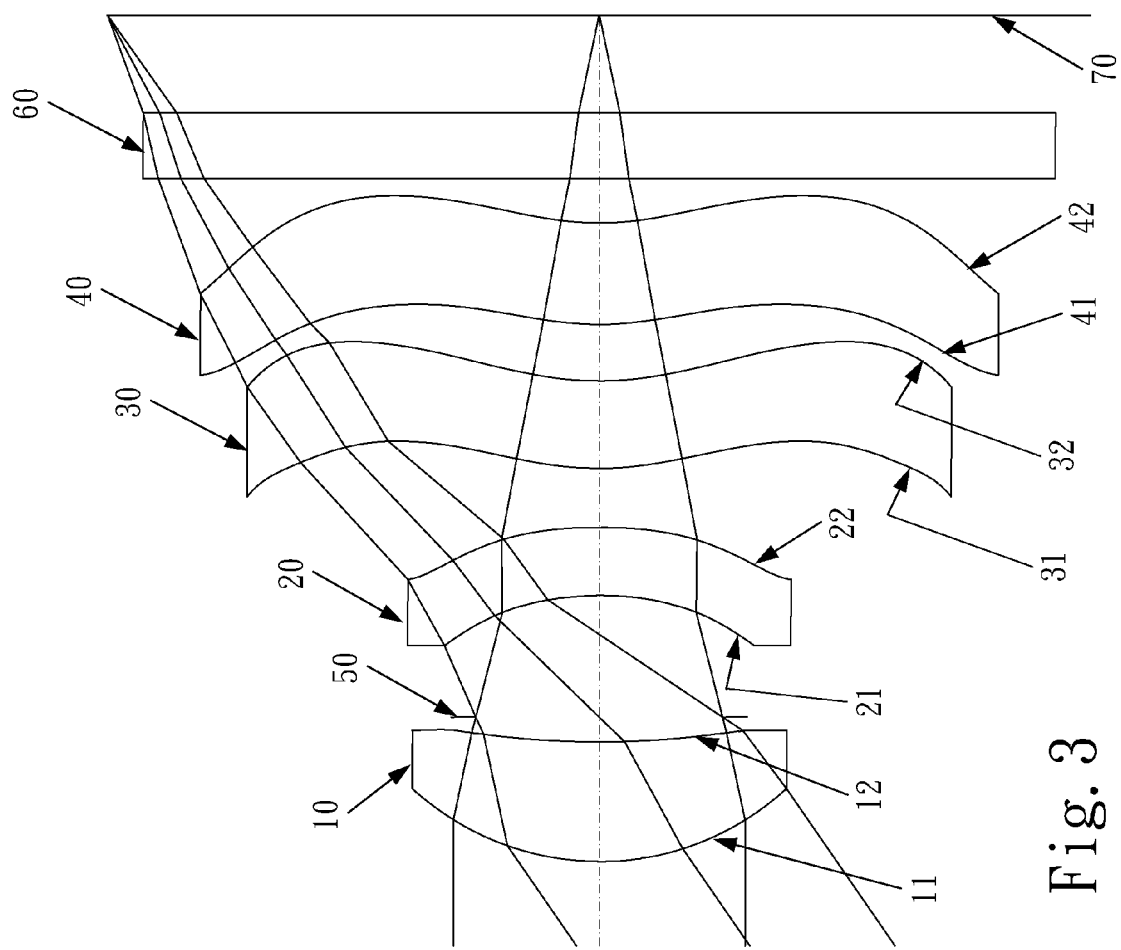
FIG. 3 shows an optical lens system for taking image in accordance with a second embodiment of the present invention.
Figure 4:
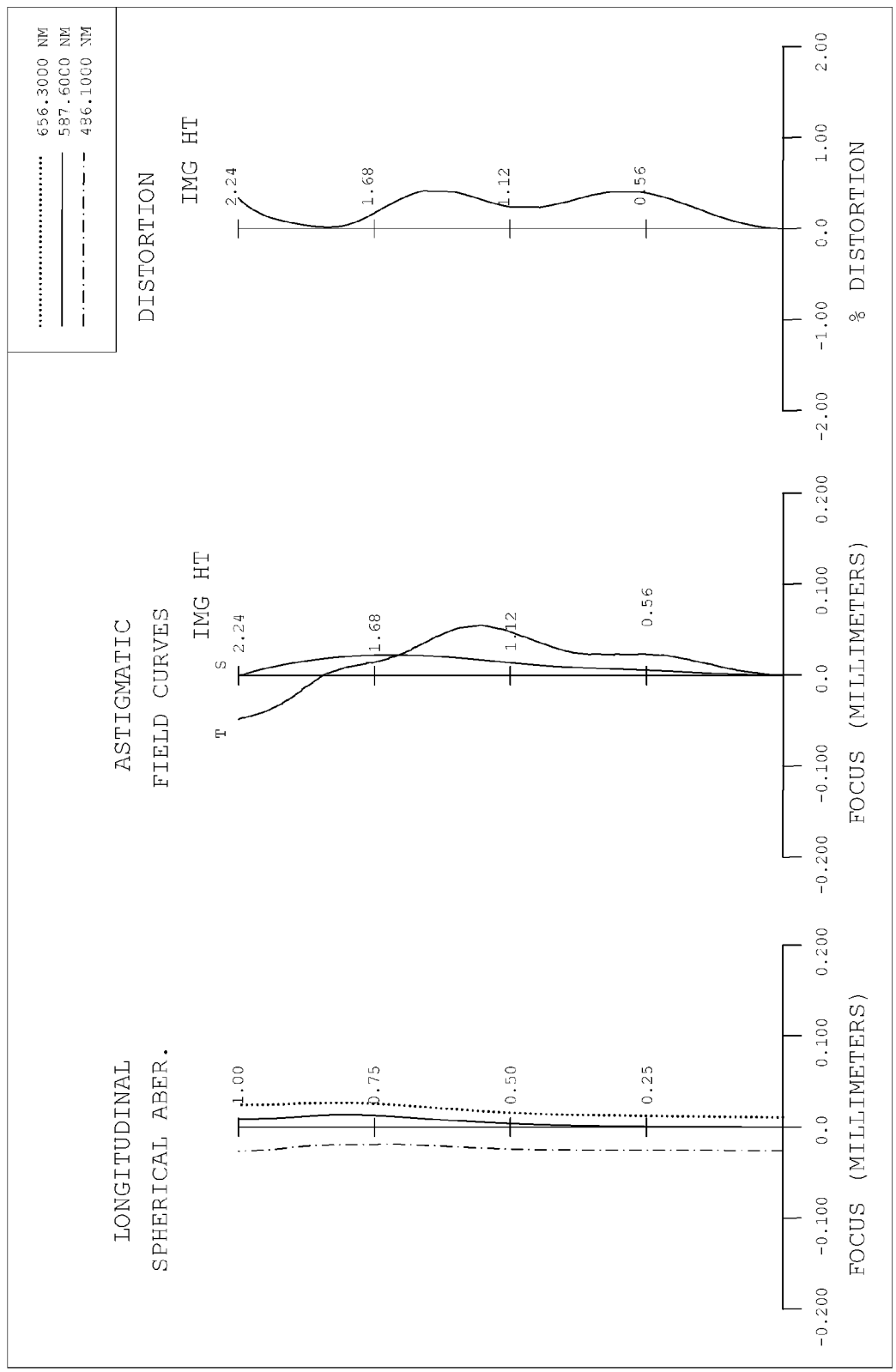
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention comprises: in order from the object side to the image side:

A first plastic lens element 10 with positive refractive power has a convex object-side surface 11 and a concave image-side surface 12, the object-side surface 11 and the image-side surface 12 of the first lens element 10 are both aspheric.

A plastic second lens element 20 with negative refractive power has a concave object-side surface 21 and a convex image-side surface 22, the object-side surface 21 and the image-side surface 22 of the second lens element 20 are both aspheric.

A plastic third lens element 30 with positive refractive power has a convex object-side surface 31 and a concave image-side surface 32, the object-side surface 31 and the image-side surface 32 of the third lens element 30 are both aspheric, and inflection points are formed on both the object-side surface 31 and the image-side surface 32 of the third lens element 30.

A plastic fourth lens element 40 with positive refractive power has a convex object-side surface 41 and a concave image-side surface 42, the object-side surface 41 and the image-side surface 42 of the fourth lens element 40 are both aspheric, and inflection points are formed on both the object-side surface 41 and the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the second lens element is f2, the focal length of the third lens element is f3, the focal length of the fourth lens element is f4, and they satisfy the relations:

$f=3.22$ [mm];

$f/f1=1.02$;

$f/f2=-0.40$;

$f/f3=0.13$;

$f/f4=0.08$.

In the second embodiment of the present optical lens system for taking image, the refractive index of the first lens element is N1, and it satisfies the relation:

$N1=1.544$.

In the second embodiment of the present optical lens system for taking image, the refractive index of the third lens element is N3, and it satisfies the relation:

$N3=1.544$.

In the second embodiment of the present optical lens system for taking image, the Abbe number of the first lens element is V1, the Abbe number of the second lens element is V2, the Abbe number of the third lens element is V3, and they satisfy the relations:

$V1=56.1$;

$V2=23.4$;

$V1-V2=32.7$;

$V3-V2=32.7$.

In the second embodiment of the present optical lens system for taking image, the on-axis distance between the third lens element and the fourth lens element is T34, the focal length of the optical lens system for taking image is f, and they satisfy the relation:

$T34/f=0.08$.

In the second embodiment of the present optical lens system for taking image, the radius of curvature of the object-side surface of the first lens element is R1, the radius of curvature of the image-side surface of the first lens element is R2, and they satisfy the relation:

$R1/R2=0.32$.

In the second embodiment of the present optical lens system for taking image, the total track length of the optical lens system for taking image is TTL, the maximum image height of the optical lens system for taking image is ImgH, and they satisfy the relation:

$TTL/ImgH=1.73$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 3.22 mm, Fno = 2.45, HFOV (half of field of view) = 34.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.25649(ASP) | 0.545 | Plastic | 1.544 | 56.1 | 3.18 |
| 2 | | 3.90030(ASP) | 0.114 | | | | |
| 3 | Ape. Stop | Plano | 0.555 | | | | |
| 4 | Lens 2 | −1.48549(ASP) | 0.312 | Plastic | 1.632 | 23.4 | −8.18 |
| 5 | | −2.25349(ASP) | 0.268 | | | | |
| 6 | Lens 3 | 1.42408(ASP) | 0.400 | Plastic | 1.544 | 56.1 | 25.03 |
| 7 | | 1.43293(ASP) | 0.258 | | | | |
| 8 | Lens 4 | 1.36627(ASP) | 0.463 | Plastic | 1.544 | 56.1 | 38.89 |
| 9 | | 1.28616(ASP) | 0.124 | | | | |
| 10 | IR-filter | Plano | 0.300 | Glass | 1.517 | 64.1 | |
| 11 | | Plano | 0.529 | | | | |
| 12 | Image | Plano | | | | | |

TABLE 4

Aspheric Coefficients

| | Surface # | | | | | | | |
|---|---|---|---|---|---|---|---|---|
| | 1 | 2 | 4 | 5 | 6 | 7 | 8 | 9 |
| k = | 1.71633E−01 | 1.28170E+00 | 2.72344E+00 | 4.79731E+00 | −2.80787E−01 | −8.96741E−01 | −5.08919E+00 | −4.04130E+00 |
| A4 = | −3.84111E−02 | −5.15186E−02 | −1.43445E−01 | −3.56273E−01 | −3.46225E−01 | −2.51384E−01 | −3.69495E−01 | −3.06285E−01 |
| A6 = | 1.95153E−01 | 4.59128E−01 | 7.37619E−02 | 4.71090E−01 | 5.86214E−02 | 8.55958E−02 | 3.12299E−01 | 2.19303E−01 |
| A8 = | −7.11421E−01 | −1.99528E+00 | 1.03776E+00 | −1.59042E−01 | 8.94395E−02 | −4.65987E−03 | −1.63477E−01 | −1.03140E−01 |
| A10 = | 1.36482E+00 | 4.39271E+00 | −4.32757E+00 | −2.97974−01 | −1.11329E−01 | −1.49614E−02 | 4.63038E−02 | 2.51586E−02 |
| A12 = | −1.33157E+00 | −5.31988E+00 | 9.26894E+00 | 9.82198E−01 | 4.90419E−02 | 5.88582E−03 | −6.44879E−03 | −2.92546E−03 |
| A14 = | 4.67451E−01 | 2.73314E+00 | −4.56111E+00 | −3.57802E−01 | −7.80245E−03 | −7.58661E−04 | 3.61347E−04 | 1.39728E−04 |

Figure 5:
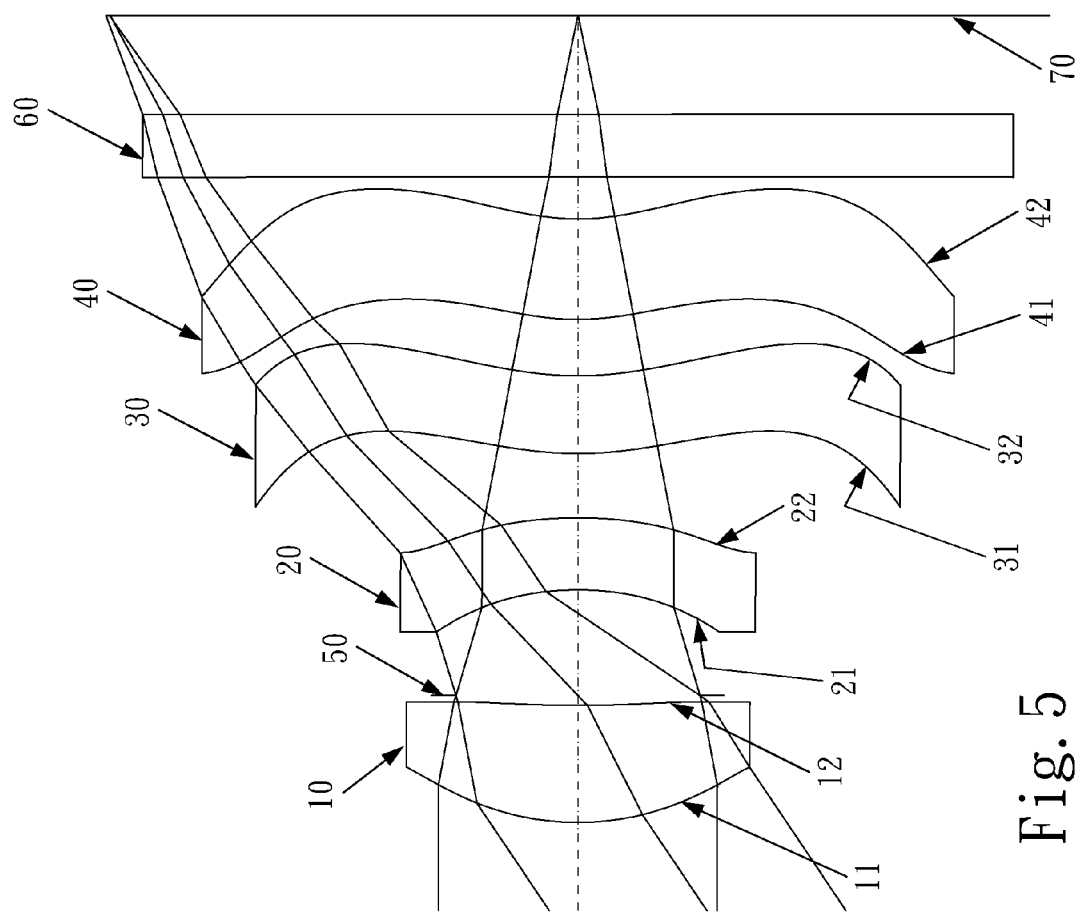
FIG. 5 shows an optical lens system for taking image in accordance with a third embodiment of the present invention.
Figure 6:
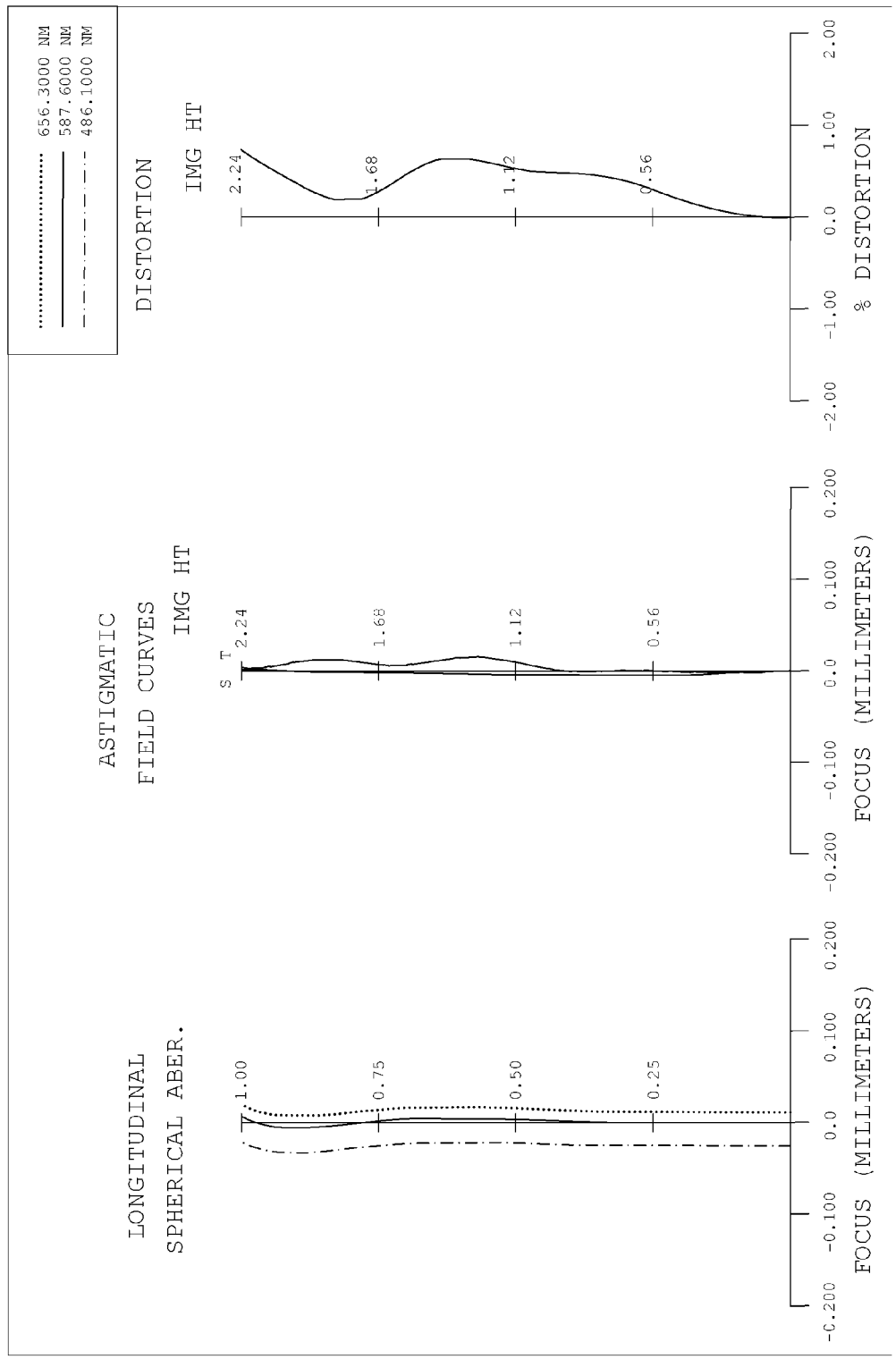
FIG. 6 shows the aberration curve of the third embodiment of the present invention.

Referring to FIG. 5, which shows an optical lens system for taking image in accordance with a third embodiment of the present invention, FIG. 6 shows the aberration curve of the third embodiment of the present invention. The third embodiment of the present invention comprises: in order from the object side to the image side:

A first plastic lens element 10 with positive refractive power has a convex object-side surface 11 and a concave image-side surface 12, the object-side surface 11 and the image-side surface 12 of the first lens element 10 are both aspheric.

A plastic second lens element 20 with negative refractive power has a concave object-side surface 21 and a convex image-side surface 22, the object-side surface 21 and the image-side surface 22 of the second lens element 20 are both aspheric.

A plastic third lens element 30 with negative refractive power has a convex object-side surface 31 and a concave image-side surface 32, the object-side surface 31 and the image-side surface 32 of the third lens element 30 are both aspheric, and inflection points are formed on both the object-side surface 31 and the image-side surface 32 of the third lens element 30.

A plastic fourth lens element 40 with positive refractive power has a convex object-side surface 41 and a concave image-side surface 42, the object-side surface 41 and the image-side surface 42 of the fourth lens element 40 are both aspheric, and inflection points are formed on both the object-side surface 41 and the image-side surface 42 of the fourth lens element 40.

An aperture stop 50 is located between the first lens element 10 and the second lens element 20.

An IR cut filter 60 is located behind the fourth lens element 40 and has no influence on the focal length of the optical lens system.

An image plane 70 is located behind the IR cut filter 60.

The equation for the aspheric surface profiles of the third embodiment has the same form as that of the first embodiment.

In the third embodiment of the present optical lens system for taking image, the focal length of the optical lens system for taking image is f, the focal length of the first lens element is f1, the focal length of the second lens element is f2, the focal length of the third lens element is f3, the focal length of the fourth lens element is f4, and they satisfy the relations:

$f=3.31$ [mm];

$f/f1=1.14$;

$f/f2=-0.40$;

$f/f3=-0.06$;

$f/f4=0.10$.

In the third embodiment of the present optical lens system for taking image, the refractive index of the first lens element is N1, and it satisfies the relation:

$N1=1.544$.

In the third embodiment of the present optical lens system for taking image, the refractive index of the third lens element is N3, and it satisfies the relation:

$N3=1.544$.

In the third embodiment of the present optical lens system for taking image, the Abbe number of the first lens element is V1, the Abbe number of the second lens element is V2, the Abbe number of the third lens element is V3, and they satisfy the relations:

$V1=56.1$;

$V2=23.4$;

$V1-V2=32.7$;

$V3-V2=32.7$.

In the third embodiment of the present optical lens system for taking image, the on-axis distance between the third lens element and the fourth lens element is T34, the focal length of the optical lens system for taking image is f, and they satisfy the relation:

$T34/f=0.08$.

In the third embodiment of the present optical lens system for taking image, the radius of curvature of the object-side surface of the first lens element is R1, the radius of curvature of the image-side surface of the first lens element is R2, and they satisfy the relation:

$R1/R2=0.22$.

In the third embodiment of the present optical lens system for taking image, the total track length of the optical lens system for taking image is TTL, the maximum image height of the optical lens system for taking image is ImgH, and they satisfy the relation:

$TTL/ImgH=1.73$.

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f(focal length) = 3.31 mm, Fno = 2.45, HFOV (half of field of view) = 34.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.29077(ASP) | 0.562 | Plastic | 1.544 | 56.1 | 2.9 |
| 2 | | 5.98090(ASP) | 0.048 | | | | |
| 3 | Ape. Stop | Plano | 0.507 | | | | |
| 4 | Lens 2 | −1.43522(ASP) | 0.344 | Plastic | 1.632 | 23.4 | −8.25 |
| 5 | | −2.16389(ASP) | 0.309 | | | | |
| 6 | Lens 3 | 1.76201(ASP) | 0.372 | Plastic | 1.544 | 56.1 | −57.83 |
| 7 | | 1.54444(ASP) | 0.271 | | | | |
| 8 | Lens 4 | 1.25321(ASP) | 0.482 | Plastic | 1.530 | 55.8 | 31.86 |

TABLE 5-continued (Embodiment 3)
f(focal length) = 3.31 mm, Fno = 2.45, HFOV (half of field of view) = 34.0 deg.

| Surface # | | Curvature Radius | Thickness | Material | Index | Abbe # | Focal length |
|---|---|---|---|---|---|---|---|
| 9 | | 1.17334(ASP) | 0.200 | | | | |
| 10 | IR-filter | Plano | 0.300 | Glass | 1.517 | 64.1 | |
| 11 | | Plano | 0.474 | | | | |
| 12 | Image | Plano | | | | | |

TABLE 6

Aspheric Coefficients

| | Surface # | | | | | | | |
|---|---|---|---|---|---|---|---|---|
| | 1 | 2 | 4 | 5 | 6 | 7 | 8 | 9 |
| k = | −3.37450E+00 | −6.75926E+01 | 2.71824E+00 | 4.52769E+00 | −4.13081E+00 | −1.29561E+01 | −1.82404E+00 | −3.61960E+00- |
| A4 = | 1.89816E−01 | −1.35367E−02 | −1.37477E−01 | −2.05949E−01 | −1.73171E−01 | −3.79245E−03 | −5.93590E−01 | −3.19459E−01 |
| A6 = | −1.37891E−01 | −7.83622E−02 | 5.23756E−01 | 4.44448E−01 | 7.34159E−02 | −4.69829E−02 | 5.75712E−01 | 2.39775E−01 |
| A8 = | 1.71544E−01 | −2.13284E−01 | −7.55989E−01 | −2.58272E−01 | −3.77955E−02 | 2.29643E−02 | −3.56794E−01 | −1.19836E−01 |
| A10 = | −1.80074E−01 | 1.47256E−01 | 1.82420E+00 | 4.31755E−01 | 6.24241E−03 | −1.00581E−02 | 1.20361E−01 | 3.05028E−02 |
| A12 = | −6.60094E−02 | | | | | 2.45555E−03 | −1.98263E−02 | −3.73899E−03 |
| A14 = | | | | | | −3.13819E−04 | 1.25188E−03 | 1.90911E−04 |

TABLE 7

| | Embodiment 1 | Embodiment 2 | Embodiment 3 |
|---|---|---|---|
| f | 3.30 | 3.22 | 3.31 |
| Fno | 2.45 | 2.45 | 2.45 |
| HFOV | 34.0 | 34.5 | 34.0 |
| N1 | 1.544 | 1.544 | 1.544 |
| N3 | 1.530 | 1.544 | 1.544 |
| V1 | 56.1 | 56.1 | 56.1 |
| V2 | 23.4 | 23.4 | 23.4 |
| V1 − V2 | 32.7 | 32.7 | 32.7 |
| V3 − V2 | 32.4 | 32.7 | 32.7 |
| f/f1 | 1.08 | 1.02 | 1.14 |
| f/f2 | −0.36 | −0.40 | −0.40 |
| f/f3 | 0.06 | 0.13 | −0.06 |
| f/f4 | −0.02 | 0.08 | 0.10 |
| T34/f | 0.10 | 0.08 | 0.08 |
| R1/R2 | 0.21 | 0.32 | 0.22 |
| TTL/ImgH | 1.72 | 1.73 | 1.73 |

It is to be noted that the tables 1-6 show different data from the different embodiments, however, the data of the different embodiments is obtained from experiments. Therefore, any product of the same structure is deemed to be within the scope of the present invention even if it uses different data. Table 7 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image comprising, from the object side to the image side:
   a first lens element with positive refractive power, an Abbe number of the first lens element being V1, and it satisfying the relation: 50<V1<60;
   a second lens element with negative refractive power having a concave object-side surface and a convex image-side surface, the second lens element being located behind the first lens element;
   a third lens element having a convex object-side surface and a concave image-side surface, the third lens element being located behind the second lens element, at least one of the object-side and the image-side surfaces of the third lens element being aspheric;
   a fourth lens element having at least one aspheric surface, the fourth lens element being located behind the third lens element; and
   an aperture stop being located before the second lens element; wherein:
   in the optical lens system for taking image, the number of the lens elements with refractive power is only four;
   the fourth lens element is made of plastic material and has a convex object-side surface and a concave image-side surface, both the object-side surface and the image-side surface of the fourth lens element are aspheric.

2. The optical lens system for taking image as claimed in claim 1, wherein the first lens element is made of plastic material, both an object-side surface and an image-side surface of the first lens element are aspheric, the second lens element is made of plastic material, both the object-side surface and the image-side surface of the second lens element are aspheric, the third lens element has positive refractive power and is made of plastic material, both the object-side surface and the image-side surface of the third lens element are aspheric.

3. The optical lens system for taking image as claimed in claim 2, wherein the object-side surface of the first lens element is convex, and the image-side surface of the first lens element is concave.

4. The optical lens system for taking image as claimed in claim 1, wherein inflection points are formed on both the third lens element and the fourth lens element.

5. The optical lens system for taking image as claimed in claim 3, wherein a refractive index of the first lens element is N1, a refractive index of the third lens element is N3, and they satisfy the relations:

1.52<N1<1.58;

1.52<N3<1.58.

6. The optical lens system for taking image as claimed in claim 5, wherein the Abbe number of the first lens element is V1, an Abbe number of the second lens element is V2, an Abbe number of the third lens element is V3, and they satisfy the relations:

$V1-V2>15$;

$V3-V2>15$.

7. The optical lens system for taking image as claimed in claim 6, wherein the Abbe number of the second lens element is V2, and it satisfies the relation:

$V2<26.8$.

8. The optical lens system for taking image as claimed in claim 1, wherein an on-axis distance between the third lens element and the fourth lens element is T34, a focal length of the optical lens system for taking image is f, and they satisfy the relation:

$T34/f>0.015$.

9. The optical lens system for taking image as claimed in claim 1, wherein the focal length of the optical lens system for taking image is f, a focal length of the third lens element is f3, a focal length of the fourth lens element is f4, and they satisfy the relations:

$-0.2<f/f3<0.2$;

$-0.2<f/f4<0.2$.

10. The optical lens system for taking image as claimed in claim 1, wherein the focal length of the optical lens system for taking image is f, a focal length of the first lens element is f1, a focal length of the second lens element is f2, and they satisfy the relations:

$0.8<f/f1<1.2$;

$-0.75<f/f2<-0.3$.

11. The optical lens system for taking image as claimed in claim 10, wherein the focal length of the optical lens system for taking image is f, the focal length of the first lens element is f1, the focal length of the second lens element is f2, and they satisfy the relations:

$0.95<f/f1<1.15$;

$-0.5<f/f2<-0.3$.

12. The optical lens system for taking image as claimed in claim 3, wherein the aperture stop is located between the first lens element and the second lens element.

13. The optical lens system for taking image as claimed in claim 12 further comprising an electronic imaging sensor for enabling an object to be photographed to be imaged on it, a total track length of the optical lens system for taking image is TTL, a maximum image height of the optical lens system for taking image is ImgH, and they satisfy the relation:

$TTL/ImgH<1.9$.

14. The optical lens system for taking image as claimed in claim 1, wherein a radius of curvature of the object-side surface of the first lens element is R1, a radius of curvature of the image-side surface of the first lens element is R2, and they satisfy the relation:

$0.3<R1/R2<0.5$.

15. The optical lens system for taking image as claimed in claim 12, wherein the radius of curvature of the object-side surface of the first lens element is R1, the radius of curvature of the image-side surface of the first lens element is R2, and they satisfy the relation:

$0.3<R1/R2<0.5$.

16. An optical lens system for taking image comprising, from the object side to the image side:
a first lens element with positive refractive power, an Abbe number of the first lens element being V1, and it satisfying the relation: $50<V1<60$;
a second lens element with negative refractive power having a concave object-side surface and a convex image-side surface, the second lens element being located behind the first lens element;
a third lens element having a convex object-side surface and a concave image-side surface, the third lens element being located behind the second lens element, at least one of the object-side and the image-side surfaces of the third lens element being aspheric;
a fourth lens element having at least one aspheric surface, the fourth lens element being located behind the third lens element; and
an aperture stop being located before the second lens element; wherein:
in the optical lens system for taking image, the number of the lens elements with refractive power is only four; and
a radius of curvature of the object-side surface of the first lens element is R1, a radius of curvature of the image-side surface of the first lens element is R2, and they satisfy the relation:

$0.3<R1/R2<0.5$.

17. The optical lens system for taking image as claimed in claim 16, wherein the Abbe number of the second lens element is V2, and it satisfies the relation:

$V2<26.8$.

18. The optical lens system for taking image as claimed in claim 16 further comprising an electronic imaging sensor for enabling an object to be photographed to be imaged on it, a total track length of the optical lens system for taking image is TTL, a maximum image height of the optical lens system for taking image is ImgH, and they satisfy the relation:

$TTL/ImgH<1.9$.

19. The optical lens system for taking image as claimed in claim 17, wherein the focal length of the optical lens system for taking image is f, a focal length of the third lens element is f3, a focal length of the fourth lens element is f4, and they satisfy the relations:

$-0.2<f/f3<0.2$;

$-0.2<f/f4<0.2$.

20. The optical lens system for taking image as claimed in claim 17, wherein the focal length of the optical lens system for taking image is f, a focal length of the first lens element is f1, a focal length of the second lens element is f2, and they satisfy the relations:

$0.8<f/f1<1.2$;

$-0.75<f/f2<-0.3$.

* * * * *